United States Patent
Hiltgen et al.

(10) Patent No.: US 9,218,200 B2
(45) Date of Patent: Dec. 22, 2015

(54) SELECTIVE CLASS HIDING IN OPEN API COMPONENT ARCHITECTURE SYSTEM

(75) Inventors: Daniel K. Hiltgen, San Jose, CA (US); Steven To, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 1284 days.

(21) Appl. No.: 12/196,091

(22) Filed: Aug. 21, 2008

(65) Prior Publication Data

US 2010/0050190 A1 Feb. 25, 2010

(51) Int. Cl.
*G06F 17/30* (2006.01)
*G06F 9/46* (2006.01)
*G06F 21/62* (2013.01)

(52) U.S. Cl.
CPC .............. *G06F 9/468* (2013.01); *G06F 21/629* (2013.01); *G06F 21/6218* (2013.01)

(58) Field of Classification Search
USPC .................. 707/782, 784, 785, 787, 999.001, 707/999.009, 999.103
See application file for complete search history.

(56) References Cited

U.S. PATENT DOCUMENTS

| | | | |
|---|---|---|---|
| 7,913,300 B1* | 3/2011 | Flank et al. | 726/12 |
| 2005/0154913 A1* | 7/2005 | Barriga et al. | 713/201 |
| 2007/0073877 A1* | 3/2007 | Boykin et al. | 709/225 |
| 2007/0134069 A1* | 6/2007 | Smith et al. | 406/39 |

* cited by examiner

*Primary Examiner* — Syed Hasan

(57) ABSTRACT

Methods, systems and computer readable media for granting class level trust in an open application programming interface (API) system is disclosed. The method includes defining a common information model (CIM) architecture, and the CIM architecture is configured with a CIM object manager (CI-MOM) for managing client requests made through APIs. The APIs are handled by the CIMOM and the CIMOM accesses schemas that include one or more classes. The method includes applying trust level settings to particular ones of the one or more classes of the schemas, and the trust level settings define client permissions to the particular classes. The method further includes hiding the particular classes to clients that lack a trust level sufficient to access the particular classes. Clients that lack the trust level are serviced with classes that do not have the applied trust level settings.

21 Claims, 4 Drawing Sheets

SELECTIVE CLASS HIDING IN OPEN API COMPONENT ARCHITECTURE SYSTEM

BACKGROUND

The computing industry has seen many advances in recent years, and such advances have produced a multitude of products and services. Computing systems have also seen many changes, including their virtualization. Virtualization of computer resources generally connotes the abstraction of computer hardware, which essentially separates operating systems and applications from direct correlation to specific hardware. Hardware is therefore abstracted to enable multiple operating systems and applications to access parts of the hardware, defining a seamless virtual machine. The result of virtualization is that hardware is more efficiently utilized and leveraged.

The advent of virtualization has sparked a number of technologies, which allow companies to optimize the utilization of their systems. As a company's enterprise systems are usually installed at various geographic locations, networking protocols are used to interconnect the various systems, which can then be virtualized into one or more virtual servers.

With the recent proliferation of virtual systems and servers, management has become increasingly important. A known object oriented model for management uses a common information model object manager (the CIMOM). A virtual server that uses a CIMOM is usually referred to as a managed system. A CIMOM isolates management applications from the various sources of management information, while providing a single, uniform way to access the information. With the CIMOM, each management application submits queries to the CIMOM in a uniform way. The CIMOM then communicates with one or more sources of the information, known as providers, to return an appropriate reply. The CIMOM can decompose queries into requests to multiple providers and synthesize the results into a single response, work with the capabilities of the providers, and the like. Although the CIMOM thus provides benefits in accessing management applications (e.g., clients), the CIMOM is also constructed with openness in mind. For instance, the various clients that attempt access to a managed system are provided with extreme latitude to discover classes, properties, method, etc., by way of simple API requests. Unfortunately, this openness runs afoul when third party client access a managed system, which then expose confidential or proprietary classes.

In view of the foregoing, there is a need for methods, systems and computer implemented processes that provide open managed system interfaces while selectively safeguarding certain information for private classes.

SUMMARY

Embodiments of the present invention provide methods, systems, and computer implemented systems that provide functionally for selectively hiding particular classes in an open system architecture. The selective hiding enables the assignment of trust levels to particular classes and to particular clients, thus providing a layer of isolation between particular functionality and un-trusted clients. It should be appreciated that the present invention can be implemented in numerous ways, such as a process, an apparatus, a system, a device or a method on a computer readable medium. Several inventive embodiments of the present invention are described below.

In one embodiment, a method for granting class level trust in an open application programming interface (API) system is disclosed. The method includes defining a common information model (CIM) architecture, and the CIM architecture is configured with a CIM object manager (CIMOM) for managing client requests made through APIs. The APIs are handled by the CIMOM and the CIMOM accesses schemas that include one or more classes. The method includes applying trust level settings to particular ones of the one or more classes of the schemas, and the trust level settings define client permissions to the particular classes. The method further includes hiding the particular classes from clients that lack a trust level sufficient to access the particular classes. Clients that lack the trust level are serviced with classes that do not have the applied trust level settings.

In another embodiment, a managed server system configured to grant class level trust to trusted clients in an open application programming interface (API) system is disclosed. The system includes a common information model (CIM) architecture, where the CIM architecture is configured with CIMOM for managing client requests made through APIs. The APIs are handled by the CIMOM and the CIMOM accesses schemas that include one or more classes. A trust level setting module is also provided. The trust level setting module is configured to grant a trust level to particular ones of the one or more classes of the schemas, and the trust level setting module defines client permissions to the particular classes. A filter module is in communication with the CIMOM for hiding the particular classes to API requests when the client permissions are not consistent with the trust level of the particular classes.

In yet another embodiment, computer readable media having program instructions embodied in physical storage is disclosed. The computer readable media, once executed, grants class level trust in an open application programming interface (API) system. The media includes program instructions for defining common information model (CIM) architecture, and the CIM architecture is configured with a CIMOM for managing client requests made through APIs. The APIs are handled by the CIMOM and the CIMOM accesses schemas that include one or more classes. The media also includes program instructions for applying trust level settings to particular ones of the one or more classes of the schemas, and the trust level settings define client permissions to the particular classes. Also provided are program instructions for hiding the particular classes to clients that lack a trust level sufficient to access the particular classes, and servicing clients that lack the trust level with classes that do not have the applied trust level settings.

Other aspects of the invention will become apparent from the following detailed description, taken in conjunction with the accompanying drawings, illustrating by way of example the principles of the invention.

DETAILED DESCRIPTION

Broadly speaking, the embodiments of the present invention provide methods and computer implemented systems that enable managed systems to operate in an open fashion to application programming interface (API) requests, while at the same time providing safeguards to information that should only be exposed to trusted clients making API requests. In one embodiment, developers of APIs are allowed to develop classes for their schemas, which can be selectively hidden, based on an assigned trust assigned to the given client. The selective hiding is configurable to different aspects of a class.

With the above overview in mind, the following description provides numerous specific details set forth in order to provide a thorough understanding of the present invention. It will be apparent, however, to one skilled in the art that the present invention may be practiced without some or all of these specific details. Operations may be done in different orders, and in other instances, well known process operations have not been described in detail in order not to unnecessarily obscure the present invention. Several exemplary embodiments of the invention will now be described in detail with reference to the accompanying drawings.

Selective hiding can be defined in terms of namespaces, classes, instances, properties, specific methods, or combinations thereof. Once a determination has been made to hide specific information, the systems enables users to store the hiding parameters in data files linked to the information to be hidden or integrated with the classes as qualifiers (e.g., typed metadata within the class definition). The information can now be integrated into a managed system, thus allowing clients to access the APIs. In one embodiment, the clients issuing the API requests will have to be identified and qualified to ascertain their assigned trust level.

If a particular client is assigned a wide level of trust, that client is qualified upon making the request and before the managed system returns on the request or allows schema data to be exposed. In the various embodiments defined herein, various techniques are defined for granting access to clients, and keeping trust alive.

Figure 1:
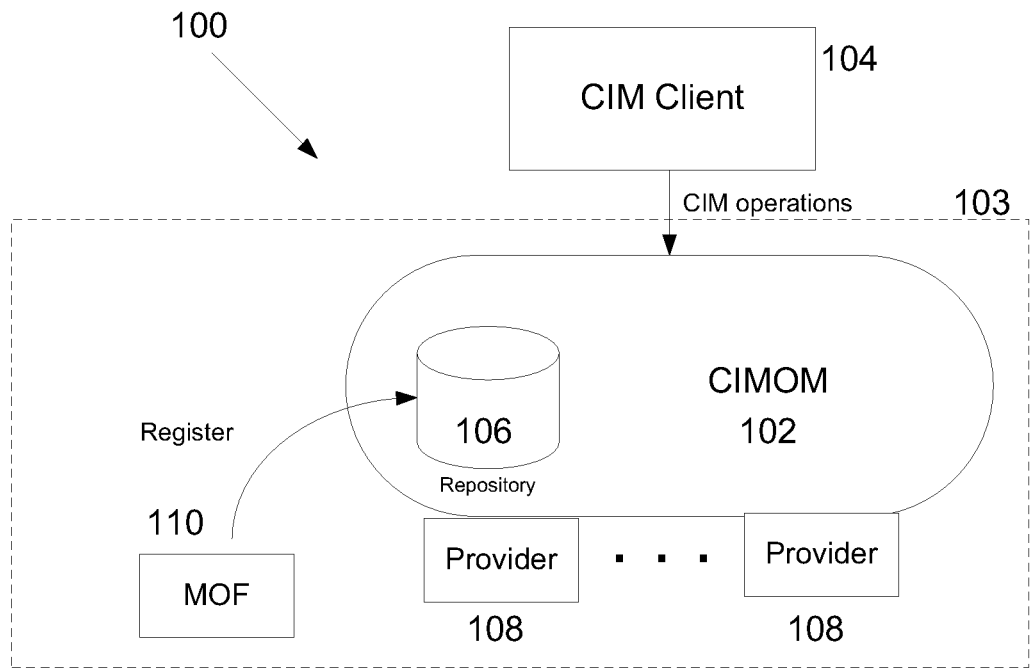
FIG. 1 illustrates an architecture used to service requests from CIM clients, in accordance with one embodiment.

With this overview in mind, FIG. 1 illustrates an architecture 100 used to service requests from CIM clients 104. CIM clients 104 communicate with a managed system 103 (e.g., CIM server), which operates with a common information model object manager (CIMOM) 102. CIMOM 102 includes a repository 106 for storing schemas that are defined by one more classes. The CIM Schema supplies a set of classes with properties and associations that provide a framework within which it is possible to organize the available information about the managed environment. The CIM Schema is therefore a combination of the Core and Common Models. CIM management information has a specific format to enable the exchange information. The CIM Specification defines a language based on the Interface Definition Language (IDL) called Managed Object Format (MOF). The MOF syntax is a way to describe object definitions in textual form, and it establishes the syntax for writing definitions. The main components of a MOF specification are textual descriptions of classes, associations, properties, references, methods and instance declarations and their associated qualifiers. Typically, a MOF file 110 can be encoded in either Unicode or UTF-8. Thus, a MOF file is typically made up of a series of class and instance declarations.

The CIM is a hierarchical, object oriented architecture that makes it easy to track and depict the often complex interdependencies and associations among different managed objects. Such interdependencies may include those between logical network connections and underlying physical devices, or those of an e-commerce transaction and the web and database servers on which it depends. The CIM is therefore an information model of a conceptual view of the managed environment, that attempts to unify and extend the existing instrumentation and management standards (SNMP, DMI, CMIP, etc.) using object-oriented constructs and design.

The CIMOM 102 is responsible for responding to client 104 requests over the network, and either responding to them directly (typically for class level operations) or forwarding the request to one or more Providers 108. Providers 108 register with the CIMOM 102 via MOF files which reflect the CIM classes that they service. As noted, schema information is stored internally in the CIMOM 102 in a repository and is used to respond directly or route requests to the appropriate provider(s) 108.

The CIM architecture 100 is inherently open. When an API is defined in CIM, client applications can easily discover the classes, properties, and methods available in that API. The CIM architecture also has other benefits such as pluggability and allows one to leverage common tools.

In one embodiment, selective hiding is implemented for specific classes managed by the CIMOM 102. Thus, if a CIM API is created, the programmer of the API can implement a level of security to the particular classes. The level of security will define the level of trust needed to access the particular classes. If a request is received from a client 104, the client will be qualified to determine the granted security level. Based on the identity of the client making the request, the CIMOM 102 or providers 108 can service the request. The serviced request, however, will seamlessly provide a reply to the request, without notifying the client that more or less services were provided. In the same manner, depending on the security/trust level assigned to the client, the client will either be allowed to see all, part of selective classes, dependencies, and associations. From the stand point of the client, the CIM architecture 100 will continue to appear open. Clients without the level of trust necessary for additional functionality or information, will be serviced with basic level schemas, which may have fewer classes. To those clients, however, the schema will appear complete, open and functional.

In one embodiment, the hiding of specific classes can be thought of as "selective hiding." The selective hiding can for namespaces, classes, properties and methods. Trusted client applications will thus be the only ones provided with the trusted access. As noted above, the CIM architecture 100 uses an object oriented data modeling approach which allows clients to query super classes and receive all known subclasses. Through this selective hiding, embodiments of the present invention enable the passive filtering of client requests which may not have been properly authorized.

Figure 2:
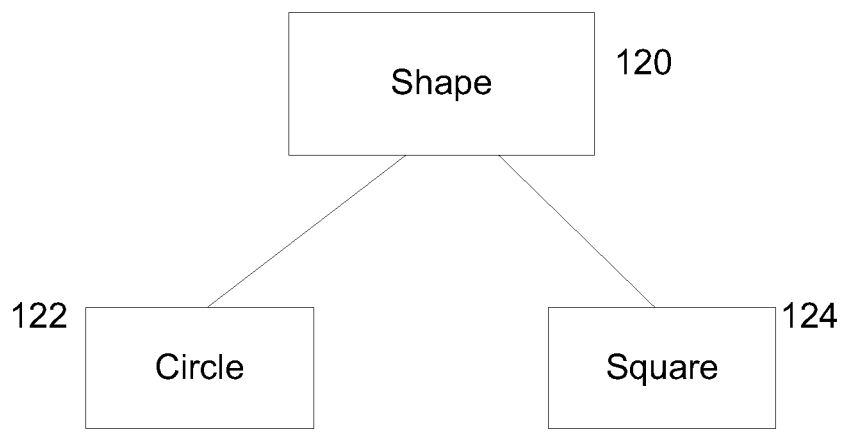
FIG. 2 illustrates a relationship diagram for classes and sub-classes in relation to trust assignment, in accordance with one embodiment.

For the purposes of simplicity, the example schema of FIG. 2 will now be described. Typically in CIM, classes begin with a prefix of "CIM_" however this will be omitted for the purposes of this discussion. One skilled in the art will, however, understand the construct of schemas and associated classes. As noted above, implementations may choose to hide any of the following types of items: Namespaces, Classes, Properties or Methods. When hiding namespaces, all classes registered in that namespace would be hidden to un-trusted clients. When hiding a class, that specific class and all sub-classes would be hidden. For example, if Circle 122 of shape 120 was hidden, un-trusted clients could see Squares 124, and if they searched for all Shapes 120, they would only see Squares 124, where trusted clients would see Squares 124 and Circles 122. When hiding Properties or Methods, the class (and instances) would be visible to un-trusted clients, but they would not see the hidden properties or methods, and would not be able to invoke those methods.

Figure 3:
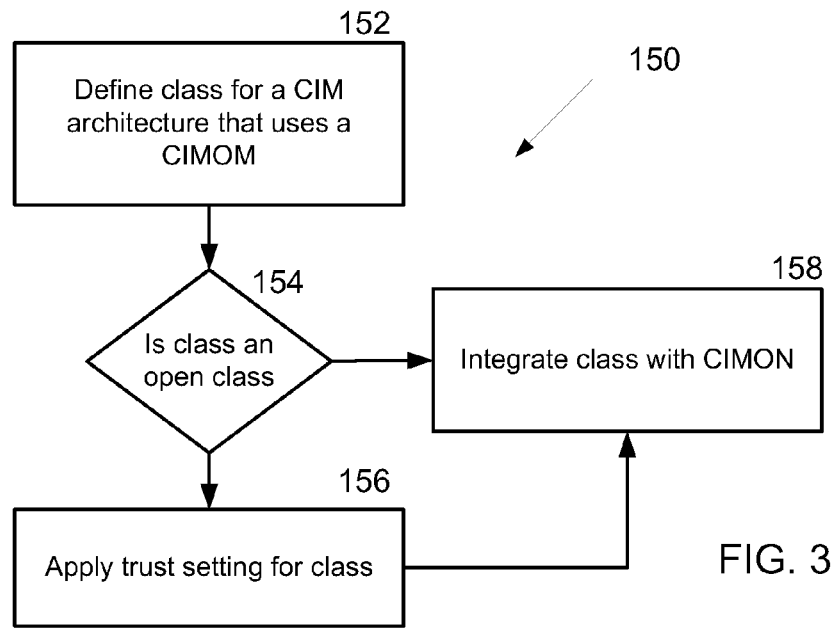
FIG. 3 illustrates a diagram for assigning trust settings to particular classes and integrating the classes with a CIMOM, in accordance with one embodiment.

FIG. 3 illustrates a high level process 150 for generating a CIM architecture, in accordance with one embodiment of the present invention. As shown, the definition of classes to be used in the CIM architecture can be augmented with trust settings. Not all classes need to be augmented, but those selected classes that are considered private, confidential or not open to a customer level, can be augmented to filter their access. Thus, when API's are called, only those classes that are open to the particular client application are accessible. In operation 154, determinations are made when classes are defined. One such determination is whether a particular class is an open class. If the class is open, then the class is integrated into the CIMOM of the managed system. Open classes can continue to provide unfiltered access to all clients making requests to particular APIs, which in turn are serviced by the schemas. The schemas will in turn operate in line with the open classes that make up the schema.

If the determination is made to apply a trust setting to a given class, the trust setting applied 156 and integrated 158 with the CIMOM of the managed system. Integration with the CIMOM allows the CIMOM to hide access to the protected classes to only those client applications that qualify for the trusted access. In one embodiment, the CIMOM is responsible for servicing or dispatching requests to providers, and thus, the CIMOM is suited to administer the trusted access.

Figure 4:
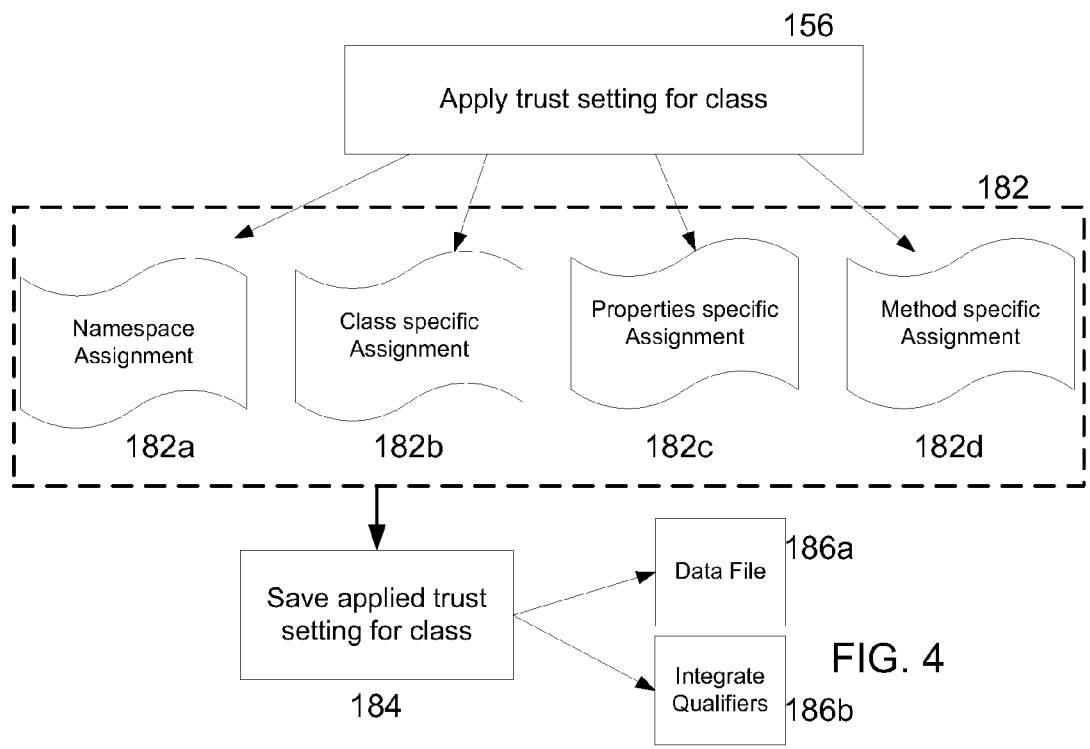
FIG. 4 illustrates a diagram for defining various trust assignments, in accordance with one embodiment.

FIG. 4 illustrates a diagram 180 of the various methods used to make an assignment of a given trust level, in accordance with one embodiment of the present invention. Broadly speaking, the application of trust in operation 156 can take on a number of forms, yet still operationally act to filter out clients from accessing classes that are not open, public, or require further authorization. With this in mind, the following examples for setting a level of trust are not exhaustive, but representative of the flexibility of the trust assignment process. Accordingly, block 182 shows a namespace assignment process 182a, a class specific assignment 182b, a properties specific assignment 182c, and a method specific assignment 182d. The namespace assignment 182a can be constructed as a global assignment for all classes in a particular name space. Thus, as classes are created and assigned to a trusted namespace, that class will automatically inherit the trust level of the class. To ensure integrity in the assignment of trust, and to not alert non-trusted client applications that certain namespaces are trusted, the very fact that the namespace exists is hidden from discovery. Consequently, namespace assignment provides for an efficient manner of assigning trust to classes, where classes assigned to the namespace are automatically assigned the same trust level as the namespace.

In one embodiment, it may be desirable to implement the private schema in a non-standard CIM namespace, and ensure that this namespace is also hidden from client requests. This could be hard-coded into the CIMOM, or determined dynamically based on the qualifiers in the MOFs. For the latter, if every provided CIM class is private in a given namespace, then the namespace itself would be private. In addition, if a namespace is marked private, the implementation could filter all class level operations, even for super-classes.

Class specific assignment 182b enables finer granularity of trust assignment, in accordance with one embodiment. For instance, schemas in the CIM architecture can include many classes. By making certain classes trusted by the trust assignment, it is possible to still enable APIs using the open classes. Properties specific assignment 182c enables the selective hiding of particular properties, or all properties of given classes. As the CIM architecture is designed to be open, particular clients applications sometimes attempt to read the structure, metadata, or definitions of particular classes, either by direct requests or automated routines. If certain classes, instances, namespaces, or methods are considered trusted and not available to a given client, hiding the existence of those properties can be beneficial. In still another example, method specific assignment 182d can also be implemented, in accordance with one embodiment. As is known, methods generically define functions that can be invoked and executed. Methods are also part of classes, as a class is a blue print that defines methods common to an object. In CIM, methods are also elements of a schema, along with the defined classes of an API. Accordingly, a trust level assignment can also be applied to methods, granting a more refined and specific denotation of what is available to certain trusted client applications.

Once the trust level setting has been defined for the class, the namespace, the properties, or methods, the trust level is saved to storage. The trust level is therefore embodied on a physical storage, can be accessed, transferred, shared, or communicated over a network to other managed virtual servers, physical systems, groups of systems or non-virtualized systems. In particular embodiments, the trust level settings can be saved to a data file 186a, integrated into qualifiers 186, or defined in new schemas that define private classes, arrays of private classes, etc. When saved to a data file, the file can be stored on memory, such as the memory that is virtualized by the managed system, or other storage that can be accessed over a network. The data file can therefore be part of the managed system or can be external to the managed system, so long as the CIM architecture can access the data file in order to apply the trust level, monitor the trust level, and quality client applications desiring access to particular classes.

As noted, one approach is to use metadata within the CIM schema definition, called Qualifiers. In CIM, qualifiers are part of the Interface Definition Language (IDL) known as MOF (Managed Object Format.) In MOF syntax, qualifiers are listed in square brackets before the item they qualify.

For example, to make the Circle class private, one might use the following MOF syntax:

```
[Private(true), Description("Some description...")]
class Circle : Shape {
    // ...
};
```

An alternative approach would be to define a new schema that describes which items should remain private. For example, one could define a new class called "PrivateItems" which would contain a list of the items which should be kept private.

Upon ensuring that particular classes are maintained hidden based on the applied trust setting, the CIM architecture is implemented to identify the clients accessing the managed system. The CIM architecture utilizes a method for checking each request to the managed system, and if the request is qualified as coming from a trusted client, then the CIM architecture will respond to the requests in a normal open fashion. If the client is not trusted, or has a lower level of trust, the client will only be serviced with those classes that are qualified for that client. In one embodiment, the client that is not trusted, should not be aware that it is not provided with more access, thus providing for a seamless hiding of functionality that is not intended for such client The client can be identified in a number of ways, and such ways are not exhaustive, but only supplied as exemplary for discussion and understanding of the flexibility of the system. Thus, for instance, clients can be identified using assigned identifiers (IDs). The client can also be prompted to perform a key pair exchange, so that transactions can occur under a secured connection. Headers can also be exchanged in specific requests, such that specific non-standard headers can connote a level of trust, as predefined between the entity making the trust assignment and the entity desiring access to the specific class. Other protocols, such as web-services (WS) protocol can be used, where a security protocol is exchanged between the managed system and the client application. Still further, the client to managed system communication can occur over HTTP with initial user log-in, where a session for that log-in can be monitored, controlled, timed-out, extended or terminated. The log-in can be based on user level, subscription level, or association with a trusted group. Thus, a number of web services can be used to establish the trust, quality the client application and then monitor security for that trusted client. Extension schemas for service classes can also be used, to enable the activation of a session. The session can then proceed during the exchange in trusted mode.

Clients having a trusted level of assignment can then issue API calls requesting services from the various trusted classes. To maintain the level of trust, clients can be registered with appropriate licensing. The licensing can thus grant trusted level assess to a suite of additional functionality that is not normally available open client accesses. As noted above, private/public key encryption schemes can be used to begin a trust level session and internet encryption can be used during the exchange. Example encryption can include public key encryption, and it can use both public key and symmetric key encryption algorithms. Random numbers generation and exchange can also be used.

In addition to encryption techniques, one embodiment of the present invention uses client and server qualification. For instance, if a client is a trusted client for a particular level of service, that client can be pre-registered with the managed server. In this manner, the client is given swifter access to the classes marked for the particular trust. In such an example, however, the client application may be required to re-qualify after a period of time, after certain cycles of transactions, or at some defined registration interval. The trust can therefore be revoked if the client stops paying, stops being part of a trusted group, or for some other administrative reason. The trust can also be assigned on a per-revision basis. That is, as each revision of an API, program, or resource is made, and more features are introduced, the trust can be granularly assigned, managed, and apportioned to the various client applications. The communication exchange can, in one embodiment, occur using a CIM xml over HTTP exchange, WS-management, TCP/IP, or some other communication protocol.

Session management, in one embodiment, is used to control the assigned trust during the period of time data is exchanged. The session control can be triggered by the managed system, such as, by routines that are in communication with the CIMOM. Thus, during a session, an HTTP connection can be held open to the trusted classes, such as by a secured socket. Cookies can also be employed to determine if a client is quickly entitled to trusted access, thus obviating the need to re-register or re-execute a qualification process. Additionally, a session could be lease based and time-out after some period of time, thus reverting back to an un-trusted state.

As noted, a session could be based on existing HTTP mechanisms such as HTTP Keep-alive to keep a socket pinned open, or HTTP Cookies. In one embodiment, using just the user-id or source IP address may be insufficient, as un-trusted client applications could use those same values and inadvertently be trusted when another trusted app is running. For added security, the approach described above could be enhanced so that a unique temporary login ID is established for the activation. When the client calls the activate method on the service, if properly authorized, a new set of temporary credentials would be established and returned. The client would then re-authenticate with the CIMOM using these new credentials. The CIMOM would be modified to accept these new credentials, and the providers would be able to detect that the ID associated with the request is the temporary authorized credentials and return the requested instances. If the account was not the authorized ID, no hidden instances would be returned.

Using existing HTTP authentication protocols, the secret could be encoded into or appended to the user-id of the authentication header. Alternatively, non-standard headers could be used to pass this information. Access could also be granted based on specialized schema operations so that no HTTP header level changes are required within a client. For example the following additional schema could be defined:

```
[Description("Private Schema Activation Service")]
class VMware_VIService : CIM_Service {
    [Description("Method to active the service")]
    uint16 ActivateInternalService(string secretKey);
    // ...
};
```

This service subclass, (which could be marked private, or left public, but who's instances would not be filtered), would support a method to establish this client as trusted.

Figure 5:
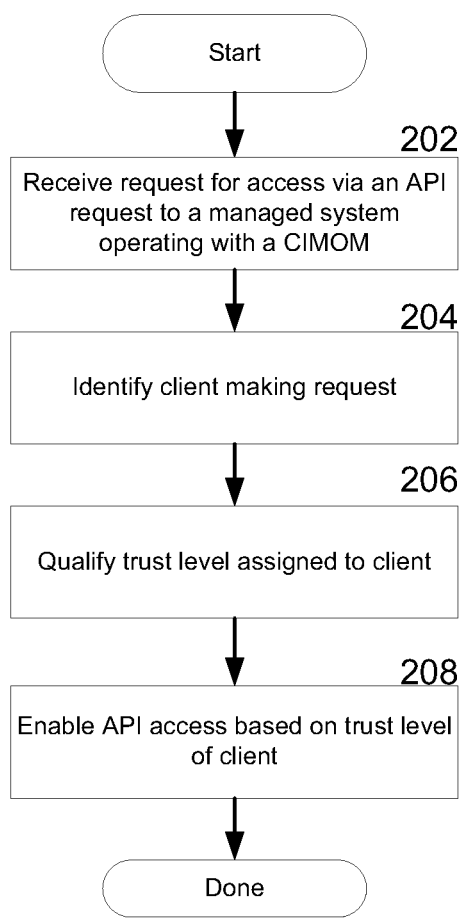
FIG. 5 illustrates a flowchart for identifying clients and providing access to trusted classes, in accordance with one embodiment.

FIG. 5 illustrates an overview flow of one example process for implementing selective hiding of classes, in an open architecture. A method 200A is show, where a request 202 is received through an API, at a managed system using a CIMOM. The example is with regard to a CIMOM, and in particular CIM architectures, but it should be understood that other systems that do not necessarily use CIM can take advantage of the hiding protocols defined herein. In operation 204, the client application making the request must be identified. Identification can take on many forms. Example identification can include receiving a client ID, and comparing the client ID to a list of known clients. New clients desiring access to the managed system can also obtain an ID, and register for a level of trust. Once the client is identified, the trust level for the client is qualified. As described above, there are number of ways for qualifying a client. Qualification can be achieved by looking up the client from a database, where the client's trust level is registered. The qualification can include exchanging data/keys, between the server and the client, to further confirm the trust level. Once qualified, the client is granted access to the classes of the API, based on the trust. In some embodiments, the qualification is transparent to the client. By making the qualification transparent, clients that do not have adequate trust level are not made aware that there are other classes that are not being made available or are hidden. In other embodiments, clients with low level trust can be notified of their trust level, which can encourage them to sign up for a plan that grants the extra functionality.

Figure 6:
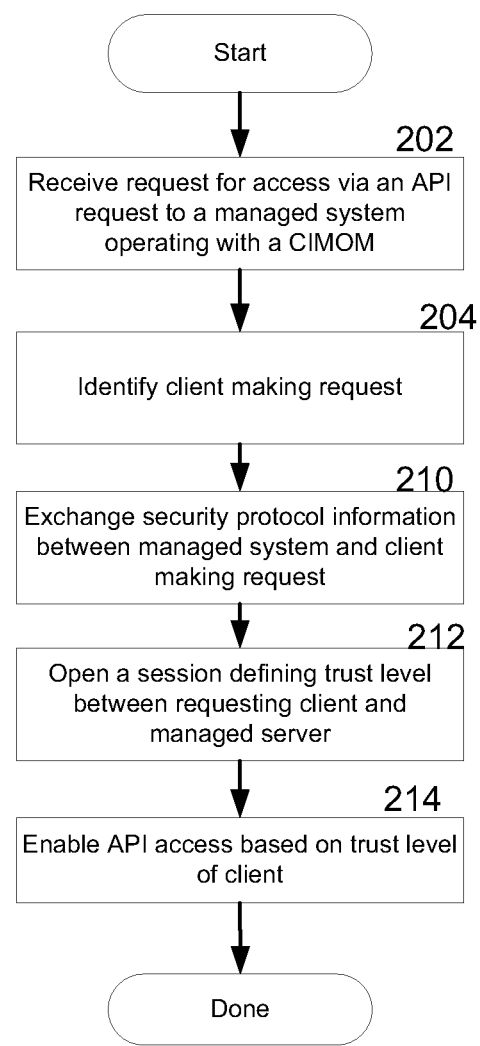
FIG. 6 illustrates a more detailed flowchart for exchanging security data and establishing sessions in trusted transactions, in accordance with one embodiment.

FIG. 6 illustrates another method 200B, which also includes operations 202 and 204. In this example, however, a security exchange is provoked between the managed system and the client. The client, by way of security information exchanges, is requested to validate its level of trust. As noted above, there a several methods for exchanging security protocol information, and any of those ways can be executed in operation 210. In operation 212, a session can be opened for the specific trust level. Thus, it is possible to open different sessions of different durations, persistency, or features, depending on the negotiated trust level of the requesting client. Clients with executive level accounts may be granted more freedom to access all classes, method, etc., while entry level accounts may only be granted basic enhanced services, and the session may be more limited. Once the trust level is defined and a session level is defined, the client can be granted access to the classes made available by the API, and make full use of the schemas enabled by the trusted classes.

Figure 7:
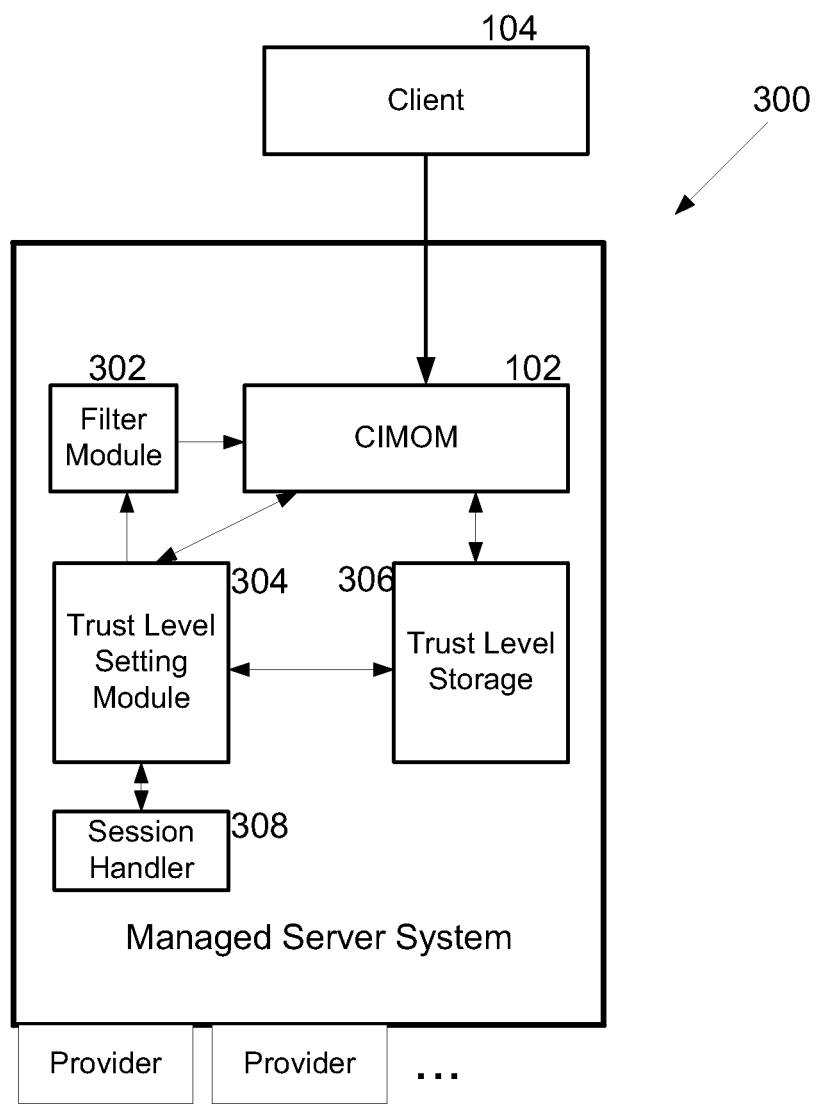
FIG. 7 illustrates example structure for a managed server system 300, in accordance with one embodiment of the present invention.

FIG. 7 illustrates example structure for a managed server system 300, in accordance with one embodiment of the present invention. The managed system includes the CIMOM 102, as well as other modules that facilitate the trust level assignment. As shown, the system includes a filter module 302 that provides information to the CIMOM 102, as to what classes have an assigned trust level, and thus enable the system 300 to appropriately service client 104. The system 300 includes a trust level setting module 304, which is concerned with allowing the setting of trust to particular classes, namespaces, instances, methods, properties, etc., in addition to confirming that classes are indeed trusted and verifying clients for trust. The trust level setting module 304 therefore communicates with filter module 302, which assist in hiding the required information from clients that do not have the adequate trust. The trust information can then be stored in trust level storage 306. Trust level storage is physical storage that is assigned for the saving of trust assignment. The trust assignment can also be stored directly in the class descriptions, using qualifiers, as discussed in more detail above.

Additionally, a session handler 308 is provided, which serves to manage the duration and scope of a trusted session between a trusted client and classes deemed appropriate for servicing the client. The structure provide herein is exemplary in nature, and can be embodiment in hardware, firmware, hardware and firmware, or combinations of software and hardware. Accordingly, it should be understood that more or less modules may be included in the system, so long as the functionality for carrying out the trust assignments and trust access is provided.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method for granting class level trust in an open application programming interface (API) system, comprising:
    defining a common information model (CIM) architecture, the CIM architecture configured with a CIM object manager (CIMOM) for managing client requests made through APIs, the APIs being handled by the CIMOM, wherein the CIMOM accesses schemas that include one or more classes;
    applying trust level settings to particular ones of the one or more classes of the schemas, the trust level settings defining client permissions to the particular classes;
    hiding the particular classes to clients that lack a trust level sufficient to access the particular classes, including preventing the clients that lack the trust level sufficient to know the existence of a particular subclass of a parent class even if the clients have access to the parent class and another subclass of the parent class by defining a new class that contains only a list of classes to be kept private; and
    servicing clients that lack the trust level with classes that do not have the applied trust level settings.

2. The method for granting class level trust in an open application programming interface (API) system as recited in claim 1, wherein applying trust level settings includes adding classes to a data file, the data file being accessed by the CIMOM to determine which class has the applied trust level.

3. The method for granting class level trust in an open application programming interface (API) system as recited in claim 1, wherein applying the trust level settings includes adding qualifiers in the form of metadata within a schema, or within a class of a schema.

4. The method for granting class level trust in an open application programming interface (API) system as recited in claim 1, wherein the hiding is selective to the clients that are identified by the CIMOM as lacking a trust level.

5. The method for granting class level trust in an open application programming interface (API) system as recited in claim 1, wherein clients are qualified for trust based on preset registration.

6. The method for granting class level trust in an open application programming interface (API) system as recited in claim 1, wherein clients negotiate an exchange of trust credentials to gain access to the classes that have the trust level settings associated therewith.

7. The method for granting class level trust in an open application programming interface (API) system as recited in claim 1, wherein the trust level settings are applied to one or more of namespaces, properties, instances or methods.

8. The method for granting class level trust in an open application programming interface (API) system as recited in claim 1, wherein the servicing further includes servicing clients with the trust level setting with enhanced functionality.

9. The method for granting class level trust in an open application programming interface (API) system as recited in claim 8, wherein the enhanced functionality opens access to additional classes.

10. The method for granting class level trust in an open application programming interface (API) system as recited in claim 8, wherein the enhanced functionality is tied to a session.

11. The method for granting class level trust in an open application programming interface (API) system as recited in claim 10, wherein the session is tied to a trusted client having a trust level setting consistent with the class.

12. A managed server system configured to grant class level trust to trusted clients in an open application programming interface (API) system, comprising:
 a common information model (CIM) architecture, the CIM architecture configured with a CIM object manager (CIMOM) for managing client requests made through APIs, the APIs being handled by the CIMOM, wherein the CIMOM accesses schemas that include one or more classes;
 a trust level setting module, the trust level setting module configured to grant a trust level to particular ones of the one or more classes of the schemas, and the trust level setting module defining client permissions to the particular classes; and
 a filter module in communication with the CIMOM for hiding the particular classes to API requests when the client permissions are not consistent with the trust level of the particular classes, the filter module being configured to prevent clients that lack a trust level sufficient to know the existence of a particular subclass of a parent class even if the clients have access to the parent class and another subclass of the parent class by defining a new class that only contains a list of classes to be kept private,
 wherein at least one of the CIM architecture, the trust level setting module and the filter module is implemented using a processor.

13. The managed server system of claim 12, wherein the filter module is configured to make the particular classes invisible to the API requests such that the existence of the particular classes is prevented from being discovered by the API requests.

14. The managed server system of claim 12, wherein the filter module is configured to hide the existence of all subclasses of the particular classes from the API requests.

15. The method of claim 12, wherein applying the trust level settings to the particular ones of the one or more classes of the schemas comprises assigning trust levels to the clients based on each revision of the APIs.

16. A managed server system configured to grant class level trust to trusted clients in an open application programming interface (API) system as recited in claim 12, wherein the filter module hides the particular classes to clients that lack a trust level sufficient to access the particular classes, such that clients that lack the trust level are serviced with classes that do not have the applied trust level settings.

17. A managed server system configured to grant class level trust to trusted clients in an open application programming interface (API) system as recited in claim 12, further comprising a session handler, the session handler applies a duration for a trusted communication between a trusted client and trusted classes of the managed server system.

18. A managed server system configured to grant class level trust to trusted clients in an open application programming interface (API) system as recited in claim 12, further comprising a trust level storage, the trust level storage including a data file, the data file being accessed by the CIMOM to determine which class has the applied trust level.

19. A managed server system configured to grant class level trust to trusted clients in an open application programming interface (API) system as recited in claim 12, wherein clients negotiate an exchange of trust credentials to gain access to the classes that have the trust level settings associated therewith, the exchange being facilitated by the trust level setting module.

20. A managed server system configured to grant class level trust to trusted clients in an open application programming interface (API) system as recited in claim 12, wherein the trust level setting module applies trust levels to one or more of namespaces, properties, instances or methods.

21. Computer readable media having program instructions embodied in physical storage, the computer readable media, once executed grants class level trust in an open application programming interface (API) system, comprising:
 program instructions for defining a common information model (CIM) architecture, the CIM architecture configured with a CIM-object manager (CIMOM) for managing client requests made through APIs, the APIs being handled by the CIMOM, wherein the CIMOM accesses schemas that include one or more classes;
 program instructions for applying trust level settings to particular ones of the one or more classes of the schemas, the trust level settings defining client permissions to the particular classes;
 program instructions for hiding the particular classes to clients that lack a trust level sufficient to access the particular classes, including preventing the clients that lack the trust level sufficient to know the existence of a particular subclass of a parent class even if the clients have access to the parent class and another subclass of the parent class by defining a new class that only contains a list of classes to be kept private; and
 program instructions for servicing clients that lack the trust level with classes that do not have the applied trust level settings.

\* \* \* \* \*